US010541887B2

(12) United States Patent
Jan et al.

(10) Patent No.: US 10,541,887 B2
(45) Date of Patent: Jan. 21, 2020

(54) CHARACTERIZATION AND ASSESSMENT OF INFORMATION TECHNOLOGY SERVICE EVENTS

(71) Applicant: International Business Machines Corporation, Armonk, NY (US)

(72) Inventors: Ea-Ee Jan, Ardsley, NY (US); Amitkumar M. Paradkar, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 15/827,136

(22) Filed: Nov. 30, 2017

(65) Prior Publication Data

US 2019/0166015 A1    May 30, 2019

(51) Int. Cl.
*G06F 15/173*    (2006.01)
*H04L 12/24*    (2006.01)

(52) U.S. Cl.
CPC .......... *H04L 41/507* (2013.01); *H04L 41/069* (2013.01); *H04L 41/0622* (2013.01); *H04L 41/5074* (2013.01); *H04L 41/5003* (2013.01)

(58) Field of Classification Search
USPC ....... 709/203, 206, 217, 219, 223, 224, 226, 709/228, 230, 232, 238; 713/340
See application file for complete search history.

(56) References Cited

U.S. PATENT DOCUMENTS

| 8,676,945 B2 | 3/2014 | Adams, Jr. |
| 2008/0263077 A1 | 10/2008 | Boston |
| 2009/0006184 A1 | 1/2009 | Leach et al. |
| 2011/0119517 A1* | 5/2011 | Beeco ................ H04L 41/0677 713/340 |
| 2014/0207928 A1 | 7/2014 | Mesnier |
| 2015/0280920 A1 | 10/2015 | Sumioka et al. |
| 2016/0028645 A1 | 1/2016 | Hohn |
| 2016/0105484 A1 | 4/2016 | Haas et al. |
| 2017/0054832 A1* | 2/2017 | Awad ...................... H04L 67/42 |
| 2017/0206474 A1* | 7/2017 | McDonald ............ G06Q 10/02 |

* cited by examiner

*Primary Examiner* — Quang N Nguyen
(74) *Attorney, Agent, or Firm* — David S. Richart; William H. Hartwell

(57) ABSTRACT

As disclosed herein an information technology service ticket characterization method includes receiving tickets from one or more client devices during a time period, determining focus windows within the time period where each focus window includes an event window, identifying tickets received within the focus windows, determining a proportion of identified tickets that are related to a service event, and based on the proportion of identified tickets that are related to the service event, assessing the quality of the service event. A corresponding system and computer program product are also disclosed herein.

17 Claims, 4 Drawing Sheets

CHARACTERIZATION AND ASSESSMENT OF INFORMATION TECHNOLOGY SERVICE EVENTS

BACKGROUND OF THE INVENTION

The present invention relates generally to the field of data processing and more particularly to information technology services.

Information technology (IT) services are activities that are performed by an organization to manage, deliver, and operate IT offered to customers. Such activities may be directed by policies and organized as processes and supporting procedures. IT services include various categories of services such as business process services, application services, and infrastructure services. IT services include a wide range of technology support for clients including hardware and software support.

SUMMARY

As disclosed herein an information technology service ticket characterization method includes receiving tickets from one or more client devices during a time period, determining focus windows within the time period where each focus window includes an event window, identifying tickets received within the focus windows, determining a proportion of identified tickets that are related to a service event, and based on the proportion of identified tickets that are related to the service event, assessing the quality of the service event. A corresponding system and computer program product are also disclosed herein.

DETAILED DESCRIPTION

Embodiments of the invention disclosed herein provide an efficient technique for characterizing a distribution of incident tickets received by an IT system and, based on the characterization, assessing the quality of the event causing at least a portion of the received tickets.

The present invention will be described in detail with reference to the Figures. The descriptions of various instances, scenarios, and examples related to the present invention are presented for purposes of illustration and are not intended to be exhaustive or limited to the embodiments disclosed.

Figure 1:
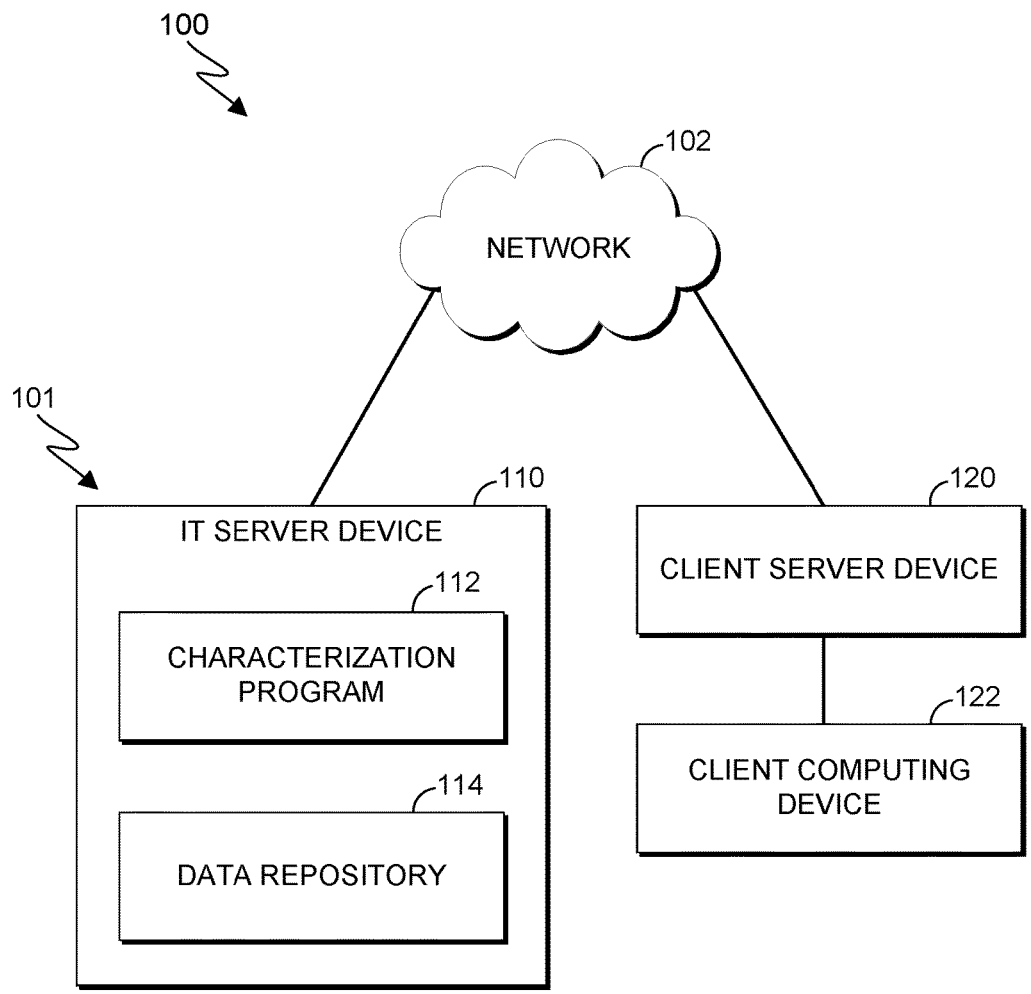
FIG. 1 is a block diagram depicting one example of a distributed information technology service environment in accordance with one or more embodiments disclosed herein.

FIG. 1 is a block diagram depicting one example of a distributed information technology (IT) service environment 100. FIG. 1 provides only an illustration of one implementation and does not imply any limitations with regard to the environments in which different embodiments may be implemented. Some modifications to the depicted environment may be made by those skilled in the art without departing from the scope of the invention as recited by the claims.

IT service environment 100 includes network 102, client server device 120, client computing device 122, and IT service system 101, which includes IT server device 110, characterization program 112, and data repository 114. IT service system 101 is a system of various hardware, software, and communications networks that act to provide a range of technology management and support to client computing devices and systems such as client computing device 122.

In some embodiments, IT server device 110 and client server device 120 are interconnected and communicate through network 102. Network 102 may be any combination of connections and protocols that support communications between IT server device 110 and client server device 120. Network 102 may be, for example, a local area network (LAN), a wireless local area network (WLAN), such as an intranet, a wide area network (WAN), such as the Internet, a telecommunications network, or any combination thereof. Network 102 may include wired, wireless, or fiber optic connections.

In some embodiments, IT server device 110 is any electronic device, or combination of electronic devices, capable of executing computer readable program instructions and communicating with any computing device in IT service environment 100. For example, IT server device 110 may be a workstation, personal computer, laptop computer, tablet, personal digital assistant, or mobile phone. In some embodiments, IT server device 110 is a computer system utilizing clustered computers and components (e.g., database server computers, application server computers) that act as a single pool of seamless resources when accessed by elements of IT service environment 100. For example, IT server device 110 may be, or include, a data center in a cloud computing environment. In some embodiments, IT server device 110 includes components as depicted and described with respect to computing system 400 in FIG. 4.

Figure 2:
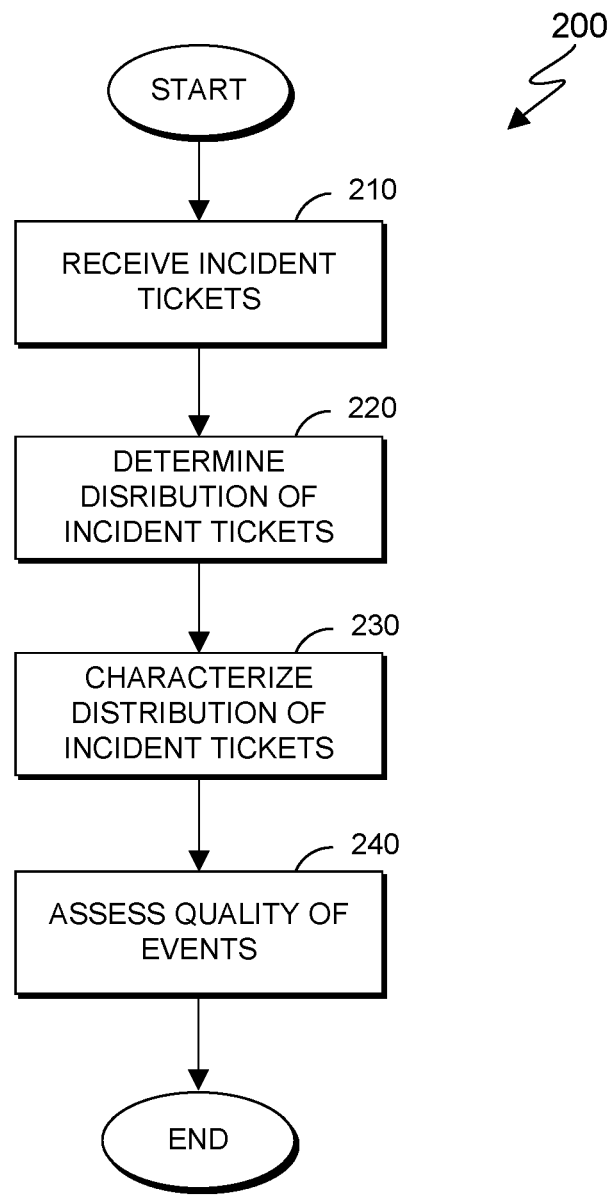
FIG. 2 is a flowchart depicting one example of a ticket characterization method in accordance with one or more embodiments disclosed herein.

Characterization program 112 may be any computer program, application, subprogram of a larger program such as an OS, or a combination thereof that performs operations of characterization method 200 of FIG. 2, which includes receiving incident tickets, determining distribution of incident tickets, characterizing distribution of incident tickets, and assessing the quality of the events of interest. In some embodiments, in response to IT server device 110 receiving an incident ticket, characterization program 112 extracts various ticket information from the ticket and stores the information in data repository 114. As depicted, characterization program 112 is located in IT server device 110. In other embodiments, characterization program 112 may located in any other computing device connected to IT service environment 100 through network 102.

In some embodiments, data repository 114 contains information related to incident tickets received by IT server 110. Such ticket information may include the date and time of receiving the ticket, the server at which the ticket is received, and the particular computer or client to which the ticket is related. Data repository 114 may be implemented with any non-volatile storage media known in the art. For example, data repository 114 may be implemented with a tape library, optical library, one or more independent hard disk drives, or multiple hard disk drives in a redundant array of independent disks (RAID). Data repository 114 may be implemented using any suitable storage architecture known in the art. For example, data repository 114 may be implemented as a relational database, an object-oriented database, or an object-relational database.

Client server device 120 may be interconnected with one or more client computing devices, such as client computing device 122, that receive technology support from IT service system 101. Client server device 120 may represent more than one substantially similar client server devices. In some embodiments, client server device 120 is substantially similar to IT server device 110 and includes substantially similar components. Client computing device 122 may be any computing device that receives technology support from IT service system 101. Client computing device 122 may represent more than one substantially similar client computing devices that are each connected to a same client server device 120. In response to a technology event occurring in client computing device 122, an incident ticket may be submitted to client server device 120 and thereafter IT service system 101. In response to receiving the incident ticket, IT service system 101 may provide support for the issue.

FIG. 2 is a flowchart depicting one example of ticket characterization method 200, in accordance with one or more embodiments disclosed herein. Characterization method 200 provides a method for estimating the amount of incident tickets received at IT service system 101 that are caused by some event of interest, such as the installation of a software security patch in an operation system across the IT system. Based on this assessment, the method provides an analysis of the quality of the event, such as determining that the security patch is a high quality change as compared with other updates. As depicted, characterization method 200 includes receiving (210) incident tickets, determining (220) the distribution of incident tickets, characterizing (230) the distribution of incident tickets, and assessing (240) quality of events. In some embodiments, characterization method 200 is performed by characterization program 112. Characterization method 200 may also be performed by any other computer program while working with characterization program 112.

Receiving (210) incident tickets may include receiving incident tickets through an IT infrastructure and extracting ticket information from the tickets. Ticket information may include, for example, the date and time of receiving the ticket, the server at which the ticket is received (e.g., client server device 120), and the particular computer or client to which the ticket is related. In some embodiments, characterization method 200 is performed with respect to tickets received from all client servers of IT service environment 100. In other embodiments, characterization method 200 is performed with respect to tickets received from one particular server (e.g., a server for a particular application) or a particular set of servers (e.g., servers supporting assets with a particular operation system). Incident tickets may be received and grouped during a particular time period of interest, for example, a one year period.

Determining (220) the distribution of incident tickets may include identifying incident tickets received within focus windows of the time period of interest. A focus window may include a defined event window and corresponding post-event window. An event window may be the time period during which some event of interest occurs in the IT system. For example, an event may be a software update in response to a change request, and the event window may be the time period during which the software update is performed in the IT system. As another example, an event may be high utilization of a computer resource such as high CPU utilization. A CPU utilization threshold may be defined, and the event window may be the time during which a computer or server within the IT system is determined to have a CPU utilization above the threshold.

Figure 3:
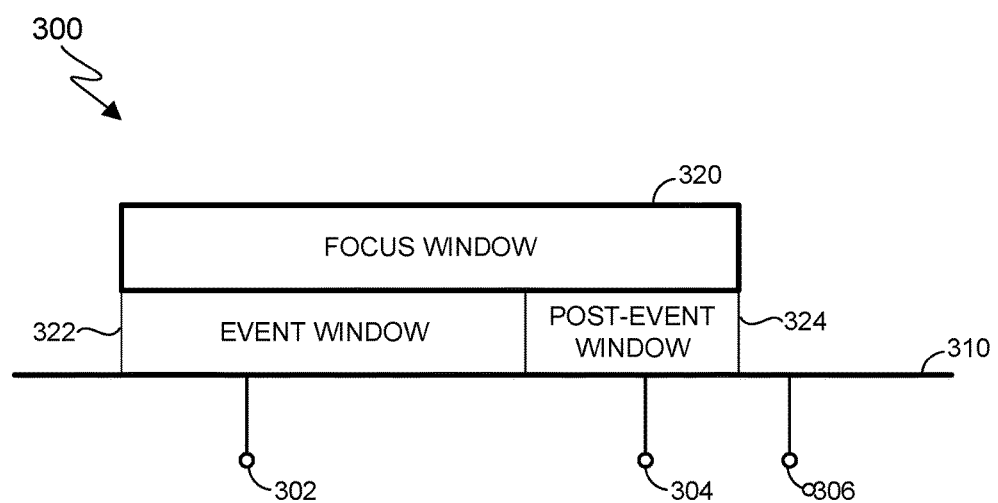
FIG. 3 is a diagram depicting one example of a ticket distribution operation in accordance with one or more embodiments disclosed herein.

Referring to FIG. 3, distribution 300 depicts an example distribution of incident tickets over a time period. Time period 310 is the total period of time over which focus windows are determined. For example, time period 310 may be a one year period. For purposes of illustration, one focus window, focus window 320, is depicted within time period 310. Focus window 320 is the total period of time measured from the start of event window 322 to the end of post-event window 324. Event window 322 may be based on, for example, performing a software update throughout the IT system. Event window 322 comprises the time period from the start of the software update to the end of the update. Post-event window 324 may be any defined time period. For example, post-event window 324 may be one day period that begins immediately following the end of event window 322, i.e., the end of the software update. Post-event window 324 is monitored for incident tickets in order to account for latent issues that arise as a result of the earlier software update. Tickets 302, 304, and 306 represent tickets received at various points during time period 310. Tickets 302 and 304 are received during focus window 320, wherein ticket 302 is received within event window 322 and ticket 304 is received within post-event window 324.

Characterizing (230) the distribution of the incident tickets may include determining the proportion, or percentage, of all incident tickets received within a focus window that are related to, or caused by, a particular type of service event. In some embodiments, a baseline intensity of receiving tickets $\lambda_i$ is determined according to the equation:

$$\lambda_i = (T^Y - T^R) / \{(N_s \cdot D_{period}) - (N_E \cdot D_{focus})\} \quad (1)$$

wherein $T^Y$ represents the total number of incident tickets received during the time period, $T^R$ represents the total number of tickets received within all focus windows, $N_s$ represents the total number of client server devices within the IT system, $D_{period}$ represents the length of the time period, $N_E$ represents the total number of the events that occur during the time period, and $D_{focus}$ represents the average length of each focus window in the time period (wherein the length is expressed in terms of the same units as $D_{period}$, for example, a number of days).

In some embodiments, the baseline intensity $\lambda_i$ enables determining the total number of tickets caused by an event within all focus windows $T^R_E$ according to the equation:

$$T^R_E = T^Y - (\lambda_i \cdot N_s \cdot D_{period}). \quad (2)$$

In some embodiments, the proportion P of all incident tickets received within a focus window that are caused by the event may be determined based on the relationship $T^R_E / T^R_i$, wherein $T^R_i$ represents the total number of tickets received that are not caused by the event. $T^R_i$ may be, for example, the difference in value between $T^R$ and $T^R_E$.

Assessing (240) quality of the event may include comparing the determined proportion against proportions for the same type of event during different time periods. For example, $P_{2016}$ may be a proportion based on a time period of one year over the course of the year 2016 and may be focused on the event of software updates based on change requests. $P_{2017}$ may be a proportion that is also be focused on the event of software updates based on change requests, but may be based on the time period of one year over 2017. It may be determined that a decrease in value from $P_{2016}$ to $P_{2017}$ represents an increase in quality of software updates.

In some embodiments, if it is determined that the quality of the event is low, a notification of the low quality is sent to the event source. For example, if the client devices of a particular client server have recently installed a software update that is determined to be lower in quality, a notification may be sent to the client server managing the installation of the software update. Further, if it is determined that the quality of the event is low, a recommendation may be made to the event source to assess, or troubleshoot, the event. For example, if it is determined that the client devices of a particular client server have low quality CPU utilization, or inefficient CPU utilization, a recommendation may be made to the client server managing the client devices to internally assess the inefficient CPU utilization by the client devices. A recommendation may also be made to stop future execution of similar events for some specified time period.

Figure 4:
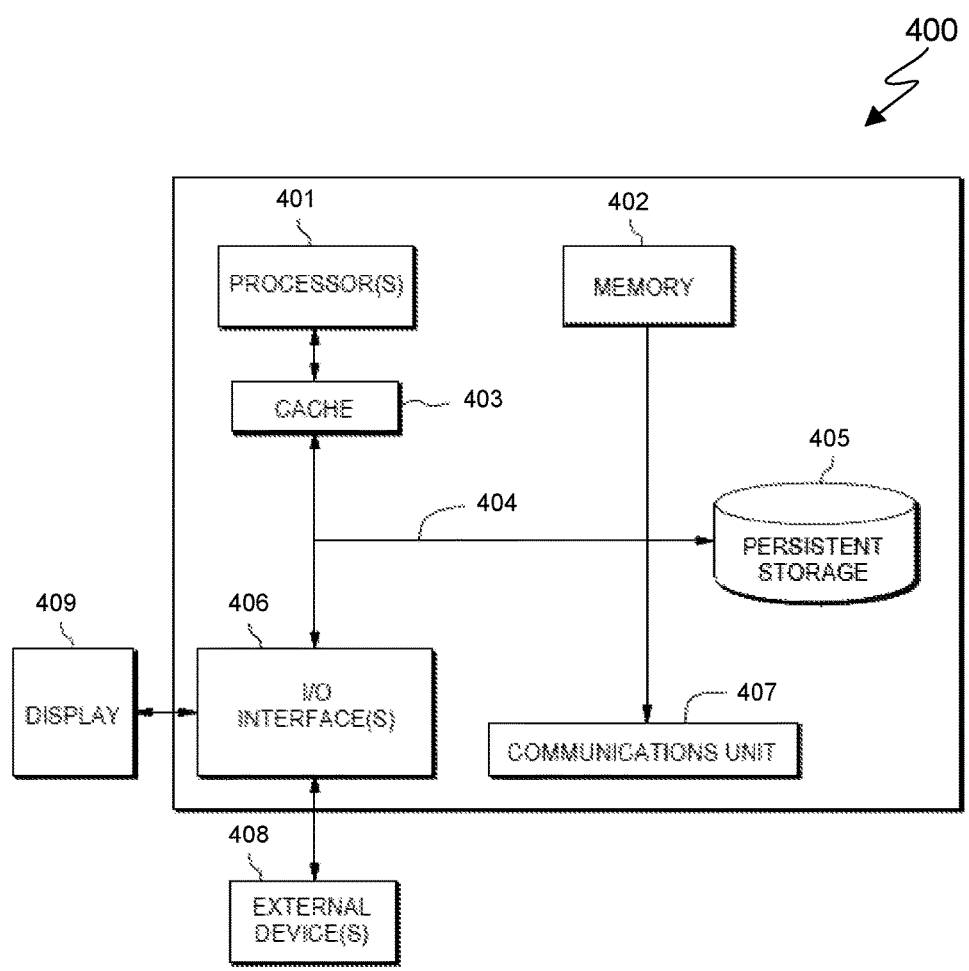
FIG. 4 is a block diagram depicting one example of a computing system suitable for executing the method of FIG. 2.

FIG. 4 depicts computing system 400, which illustrates components of IT server device 110, which includes characterization program 112. Computing system 400 includes processor(s) 401, cache 403, memory 402, persistent storage 405, communications unit 407, I/O interface(s) 406, and communications fabric 404.

Communications fabric 404 provides communications between cache 403, memory 402, persistent storage 405, communications unit 407, and I/O interface(s) 406.

Communications fabric 404 can be implemented with any architecture designed for passing data and/or control information between processors (e.g., microprocessors, communications and network processors, etc.), system memory, peripheral devices, and any other hardware components within a system. For example, communications fabric 404 may be implemented with one or more buses or a crossbar switch.

Memory 402 and persistent storage 405 are computer readable storage media. In an embodiment, memory 402 includes random access memory (RAM) (not shown). Memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 through I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

What is claimed is:

1. A method comprising:
   receiving a plurality of tickets from one or more client devices during a time period;
   determining a plurality of focus windows within the time period, wherein each focus window includes an event window;
   identifying tickets received within the plurality of focus windows;
   determining a proportion of identified tickets that are related to a plurality of service events; and
   based at least in part on the proportion of identified tickets that are related to the plurality of service events, assessing a quality of the plurality of service events;
   wherein assessing the quality of the plurality of service events comprises comparing the proportion of identified tickets with a second proportion of identified tickets, wherein the second proportion of identified tickets is determined based on a plurality of tickets received during a second time period.

2. The method of claim 1, wherein the event window comprises a length of time equivalent to the duration of the plurality of service events.

3. The method of claim 1, wherein each focus window includes a post-event window, wherein the post-event window comprises a length of time commencing immediately following the event window.

4. The method of claim 1, wherein the plurality of service events are selected from the group consisting of a software update applied to a client device and a resource utilization beyond a threshold utilization.

5. The method of claim 4, wherein the resource utilization comprises CPU utilization by a client device.

6. The method of claim 1, wherein assessing the quality of the plurality of service events is based, at least in part, on a number of the plurality of service events that occur during the time period, an average length of time of the plurality of focus windows, and a number of the one or more client devices.

7. A computer program product comprising:
one or more computer readable storage media; and
program instructions stored on the one or more computer readable storage media, the program instructions comprising:
program instructions to receive a plurality of tickets from one or more client devices during a time period;
program instructions to determine a plurality of focus windows within the time period, wherein each focus window includes an event window;
program instructions to identify tickets received within the plurality of focus windows;
program instructions to determine a proportion of identified tickets that are related to a plurality of service events; and
program instructions to, based at least in part on the proportion of identified tickets that are related to the plurality of service events, assess a quality of the plurality of service events;
wherein the program instructions to assess the quality of the plurality of service events comprise program instructions to compare the proportion of identified tickets with a second proportion of identified tickets, wherein the second proportion of identified tickets is determined based on a plurality of tickets received during a second time period.

8. The computer program product of claim 7, wherein the event window comprises a length of time equivalent to the duration of the plurality of service events.

9. The computer program product of claim 7, wherein each focus window includes a post-event window, wherein the post-event window comprises a length of time commencing immediately following the event window.

10. The computer program product of claim 7, wherein the plurality of service events are selected from the group consisting of a software update applied to a client device and a resource utilization beyond a threshold utilization.

11. The computer program product of claim 10, wherein the resource utilization comprises CPU utilization by a client device.

12. The computer program product of claim 7, wherein the program instructions to assess the quality of the plurality of service events are based at least in part on a number of the plurality of service events that occur during the time period, an average length of time of the plurality of focus windows, and a number of the one or more client devices.

13. A computer system comprising:
one or more computer processors;
one or more computer readable storage media; and
program instructions, stored on the one or more computer readable storage media, for execution by at least one of the one or more computer processors, the program instructions comprising:
program instructions to receive a plurality of tickets from one or more client devices during a time period;
program instructions to determine a plurality of focus windows within the time period, wherein each focus window includes an event window;
program instructions to identify tickets received within the plurality of focus windows;
program instructions to determine a proportion of identified tickets that are related to a plurality of service events; and
program instructions to, based at least in part on the proportion of identified tickets that are related to the plurality of service events, assess a quality of the plurality of service events;
wherein the program instructions to assess the quality of the plurality of service events comprise program instructions to compare the proportion of identified tickets with a second proportion of identified tickets, wherein the second proportion of identified tickets is determined based on a plurality of tickets received during a second time period.

14. The computer system of claim 13, wherein the event window comprises a length of time equivalent to the duration of the plurality of service events.

15. The computer system of claim 13, wherein each focus window includes a post-event window, wherein the post-event window comprises a length of time commencing immediately following the event window.

16. The computer system of claim 13, wherein the plurality of service events are selected from the group consisting of a software update applied to a client device and a resource utilization beyond a threshold utilization.

17. The computer system of claim 13, wherein the program instructions to assess the quality of the plurality of service events are based at least in part on a number of the plurality of service events that occur during the time period, an average length of time of the plurality of focus windows, and a number of the one or more client devices.

* * * * *